Patented Sept. 28, 1937

2,094,503

UNITED STATES PATENT OFFICE 2,094,503

METHOD OF REFINING ROSIN

Donald H. Sheffield, Brunswick, Ga., assignor to Hercules Powder Company, Wilmington, Del., a corporation of Delaware No Drawing. Application May 26, 1934.
Serial No. 727,735

7 Claims. (Cl. 87—2)

This invention relates to a method for refining rosin. More particularly, this invention relates to a method for effecting the removal of color bodies from rosin with economy and efficiency.

Heretofore it has been recognized that rosin, and more particularly wood rosin and low grade gum rosin, contain color bodies, the presence of which substantially limits the use of such rosin in the commercial arts. Wood rosin and low grade gum rosin contain color bodies which are visible to the eye and affect the color and appearance of the rosin, and also certain color bodies, the exact nature of which is not generally known and which are normally invisible. The presence of normally invisible or so-called latent color bodies in such rosins is of extreme disadvantage, in that they darken and become visible in the presence of air and an alkali, and hence rosin containing such latent color bodies is undesirable for many uses, such as in soaps, sizes, limed varnishes, etc. where a light colored product is desirable.

Heretofore color bodies, including latent color bodies, have been removed from rosin, as wood rosin and low grade gum rosin, by treatment of such rosin in solution in a suitable solvent with furfural. Such treatment, in general, involves the addition of furfural to a solution of rosin in a solvent capable of immiscibility with furfural, heating or agitating the mixture to insure maximum contact, separation of the furfural from the rosin solution after cooling to render the furfural immiscible and recovery of the rosin from the rosin solution as by evaporation off of the solvent. The furfural functions to effect removal of color bodies, visible and latent, from the rosin by virtue of the fact that it has a greater solvent power on the color bodies than on rosin, as compared with the relative solvent power of the rosin solvent. As a consequence, the furfural selectively dissolves visible and latent color bodies contained in the rosin solution and on separation of the furfural from the solution the color bodies are separated therewith and the rosin is recovered from the solution after separation of the furfural, largely freed from such color bodies. The separated furfural is recovered for reuse by evaporation, leaving a residue including as components color bodies of the rosin, a relatively small amount of abietic acid, etc.

The procedure involving the refining of rosin, more particularly, by the removal of color bodies including latent color bodies therefrom, through extraction thereof with furfural, is more fully described and forms the subject matter of United States Letters Patent No. 1,715,088, dated May 28, 1929, to Harry E. Kaiser and Roy S. Hancock.

While the process of refining rosin with the use of furfural, as outlined above, constituted at the time of its conception a generic advance in the art, and while the process is presently of the greatest advantage to the art, it has been found that rosin, which, as is well known, comprises a mixture of components, contains certain components the exact nature of which is not generally known, which react with furfural. As a consequence, in carrying out the procedure outlined, despite the fact that the furfural used is largely recovered from dissolved color bodies and other rosin components after separation from the rosin solution, a substantial amount of the furfural is lost through reaction with the furfural-reactive components of the rosin. Further, such furfural reaction products remain in the residue obtained in connection with the recovery of the furfural and are disadvantageous as components thereof for many uses.

In accordance with this invention it has been found that the components of the rosin, which in the treatment above outlined react with furfural, are insoluble in rosin solvents adaptable for use in the process, such, for example, as relatively light petroleum fractions, as gasoline, petroleum naphtha and the like, and that as a consequence, loss of furfural through reaction and the presence of furfural reaction products in the residue recovered from the furfural after treatment of the rosin may be avoided by removal of such insolubles from the rosin prior to treatment with furfural or after the mixture of a rosin solution and furfural, but before heating to accomplish maximum contact between the rosin solution and the furfural.

More particular, in accordance with this invention there is provided a method for refining rosin, involving removal of latent and visible color bodies, therefrom, by the treatment of rosin in solution with furfural, which more particularly includes a step whereby the components of the rosin reactive with furfural are removed, with the result that a saving in furfural is effected and the presence of furfural reaction products in the residue recovered from the furfural is avoided.

In general, the process in accordance with this invention involves forming a solution of rosin in a suitable petroleum hydrocarbon solvent, as any light petroleum distillate, such, for example, as gasoline, petroleum naphtha, or the like, filtering the solution through any suitable filtering material capable of removing petroleum hydrocarbon insolubles from the solution, such, for example, as fuller's earth, kieselguhr, sand, silica gel, or the like, and then admixing furfural with the solution, heating to promote immiscibility of the furfural with the rosin solution, or agitating, and separating the furfural and dissolved color bodies from the rosin solution. The rosin solution is then recovered by evaporation of the solvent, which may be reused and the furfural is recovered for reuse by evaporation and the residue obtained put to such uses as it may be adaptable for.

As an alternative procedure, furfural in limited quantity may be mixed with the rosin solution prior to filtration thereof, or the solvent for the rosin may be recovered from previous refining with furfural and containing a limited quantity of furfural in admixture therewith, and the mixture filtered, care being taken to maintain the mixture below a temperature at which the furfural will react with furfural-reactive components of the rosin. The furfural will dissolve the furfural-reactive components of the rosin and the resultant viscous solution will separate from the petroleum hydrocarbon in the form of globules, which will adhere to a filtering medium. After filtration of the mixture, additional furfural is added and heat may be applied to promote contact of the furfural and rosin solution, or the mixture may be agitated for such purpose, followed by separation of the furfural and color bodies dissolved thereby from the rosin solution, all without loss of furfural through reaction.

The furfural remaining in the filtering medium and containing furfural reactive bodies may be recovered at temperatures below 100° C. which do not allow perceptible reaction, by dissolving the sludge from the filter with a solvent, as, for example, methanol, benzol, toluol, acetone, etc., with subsequent fractionation under vacuum to yield the solvent, furfural, and the non-volatile resin and furfural reaction bodies. The recovered furfural may be again used for refining and the solvent as a wash.

In proceeding in accordance with this invention, more particularly, the rosin solution may contain any concentration of rosin within wide limits. It will be preferable, however, that the rosin concentration of the solution does not exceed about 25% rosin. Where furfural is added to the rosin solution before filtration, or where recovered rosin solvent containing furfural is used, the furfural may be present in widely varying amount, it being desirable, however, that the amount of furfural present does not exceed that amount which will give a saturated solution in the rosin solvent at a temperature of about 50° C. Furfural in amount of about 5% of the weight of the rosin solvent will usually be sufficient.

The filtering medium may, as has been indicated, comprise fuller's earth, kieselguhr, sand, silica gel, or other medium presenting a large contact surface. The bed of filtering material may be of any desired thickness, but in any event will comprise sufficient filtering material to effect the removal of petroleum hydrocarbon insolubles from the rosin solution under given conditions such as, for example, rate of flow with reference to thickness of bed.

If desired, there may be added to the rosin solution small amounts of, for example, turpentine, pine oil, or other terpenes in place of furfural, for which they are equivalent as solvents of the petroleum hydrocarbon-insoluble, furfural-reactive components of the rosin. If such are used, they will desirably not be used in amount in excess of about 5% of the weight of the rosin solvent.

As will be obvious, no special form of apparatus is necessary for the carrying out of the method in accordance with this invention, it being obvious that any suitable form of filter capable of obtaining sufficient filtering material for the purpose and adapted for the passage of rosin solution may be used.

The method in accordance with this invention will be found to be advantageous in effecting the removal of components of the rosin which in the refining treatment react with furfural and cause loss thereof, it having been found, for example, that the content of such components in a rosin-gasoline solution may be reduced to a maximum of about .3%, or below. The removal of such components, which it has been indicated have been found to be reactive with furfural, is, as pointed out above, of distinct advantage in that not only is a saving in furfural used in the refining of the rosin effected, but a residue is obtained in connection with recovery of furfural for reuse free from furfural reaction products.

As more specifically illustrative of procedure in accordance with this invention, for example, about 120,000 pounds of a solution of FF rosin in gasoline of a rosin concentration of about 25% is filtered through a bed of sand having a depth of about 1 foot and a surface area of about 40 square feet. To the solution after filtration there is then added about 12,000 pounds of furfural and the mixture is then heated to about 50° C. to promote contact between the furfural and the rosin solution. The solution or mixture is then cooled down to promote immiscibility of the furfural and the furfural, with dissolved color bodies, is permitted to separate out from the rosin solution by gravity. The rosin solution is drawn off and the refined rosin recovered. The furfural is recovered for reuse by evaporation and the residue comprising essentially color bodies and a small amount of rosin recovered.

In following the procedure, more specifically, if desired, the gasoline-rosin solution to be filtered may contain 4000 pounds of furfural. In such cases, however, care must be taken prior to filtration that the temperature of the mixture be not raised in excess of about 50° C. in order to avoid reaction of the furfural reactive components of the rosin, which are to be removed by filtration and in order to obtain efficient removal. The furfural will dissolve the furfural reactive components of the solution and the resultant furfural solution will separate from the rosin solution. On filtration, the furfural solution, due to its viscosity, will adhere to the contact surfaces of the filtering medium. The furfural adhering to the filtering medium may be recovered as described above.

It will be noted that while in the carrying out of the process in accordance with this invention, filtering media, such as fuller's earth and kieselguhr are adaptable, the result may be obtained by filtration through common sand, it having been found that the furfural-reactive bodies contained by rosin may be removed from a solution of rosin in a petroleum hydrocarbon as effectively using a filtering medium having contact area such as possessed by sand as with a filtering medium such as fuller's earth or kieselguhr. It will be noted that the function of the filter in accordance with this invention is to remove petroleum hydrocarbon-insoluble, furfural-reactive components of the rosin prior to a refining treatment with furfural, as compared with decolorizing, for which purpose filtration through media such as fuller's earth and kieselguhr has heretofore been effected.

It will be understood that the method in accordance with this invention from the broad standpoint contemplates filtration of a petroleum hydrocarbon solution of rosin through a filtering media capable of removing petroleum hydrocarbon-insoluble, furfural-reactive components of the rosin prior to a refining treatment with furfural. Consequently, it will be understood that the method in accordance with this invention is not limited by the necessity for following out any particular procedure or to any particular proportions of ingredients, nor to the use of any particular apparatus. As indicated, the method in accordance with this invention is advantageous especially in a saving of furfural by the avoidance of loss thereof through reaction, in the refining treatment, with furfural-reactive components of the rosin.

What I claim and desire to protect by Letters Patent is:

1. The method of refining rosin which includes forming a solution of rosin in a petroleum hydrocarbon distillate containing furfural in amount not in excess of that which will form a saturated solution in the petroleum distillate at 50° C., filtering the solution through a bed of a solid inorganic absorbent material for the removal of petroleum hydrocarbon-insoluble, furfural-reactive components of the rosin dissolved in the furfural while avoiding raising the temperature of the solution above that at which furfural and the furfural-reactive components of the rosin will react, mixing furfural with the filtered rosin solution, heating the mixture to promote contact between the furfural and rosin solution, cooling to promote immiscibility of the furfural, separating the furfural and rosin components dissolved thereby from the rosin solution and recovering refined rosin by evaporation of the petroleum hydrocarbon distillate therefrom.

2. The method of refining rosin which includes forming a solution of rosin in a petroleum hydrocarbon distillate of a rosin concentration not in excess of about 25%, said solution containing furfural in amount not in excess of that which will give a saturated solution in the distillate at 50° C., filtering the solution through sand while avoiding raising the temperature of the solution above about 50° C., admixing furfural with the filtered rosin solution, effecting separation of furfural and dissolved color bodies from the rosin solution and recovering refined rosin by evaporation off of the petroleum distillate.

3. The method of refining rosin which includes forming a solution of rosin in a petroleum hydrocarbon distillate containing furfural in amount not in excess of that which will form a saturated solution in the petroleum distillate at 50° C., filtering the solution through a bed of a solid inorganic absorbent material while avoiding raising the temperature of the solution above that at which furfural and the furfural-reactive components of the rosin will react, whereby the petroleum hydrocarbon-insoluble, furfural-reactive components of the rosin, dissolved in the furfural to form a viscous solution, are substantially completely removed, mixing furfural with the filtered rosin solution to effect extraction of color bodies therefrom, separating furfural and dissolved color bodies from the rosin solution and recovering refined rosin from the rosin solution.

4. The method of refining rosin which includes forming a solution of rosin in a petroleum hydrocarbon distillate containing furfural in amount not in excess of that which will form a saturated solution in the petroleum distillate at 50° C., filtering the solution through a bed of a solid inorganic absorbent material while avoiding raising the temperature of the solution above about 50° C., whereby the petroleum hydrocarbon-insoluble, furfural-reactive components of the rosin, dissolved in the furfural to form a viscous solution, are substantially completely removed, mixing furfural with the filtered rosin solution to effect extraction of color bodies therefrom, separating furfural and dissolved color bodies from the rosin solution and recovering refined rosin from the rosin solution.

5. The method of refining rosin which includes forming a solution of rosin in a petroleum hydrocarbon distillate containing furfural in amount not in excess of that which will form a saturated solution in the petroleum distillate at 50° C., filtering the solution through fuller's earth while avoiding raising the temperature of the solution above that at which furfural and the furfural-reactive components will react, whereby the petroleum hydrocarbon-insoluble, furfural-reactive components of the rosin, dissolved in the furfural to form a viscous solution are substantially completely removed, mixing furfural with the filtered rosin solution to effect extraction of color bodies therefrom, separating furfural and dissolved color bodies from the rosin solution and recovering refined rosin from the solution.

6. The method of refining rosin which includes forming a solution of rosin in a petroleum hydrocarbon distillate containing furfural in amount not in excess of that which will form a saturated solution in the petroleum distillate at 50° C., filtering the solution through kieselguhr while avoiding raising the temperature of the solution above that at which furfural and the furfural-reactive components will react, whereby the petroleum hydrocarbon-insoluble, furfural-reactive components of the rosin, dissolved in the furfural to form a viscous solution, are substantially completely removed, mixing furfural with the filtered rosin solution to effect extraction of color bodies therefrom, separating furfural and dissolved color bodies from the rosin solution and recovering refined rosin from the solution.

7. The method of refining rosin which includes forming a solution of rosin in a petroleum hydrocarbon distillate containing furfural in amount not in excess of that which will form a saturated solution in the petroleum distillate at 50° C., filtering the solution through sand while avoiding raising the temperature of the solution above that at which furfural and the furfural-reactive components will react, whereby the petroleum hydrocarbon-insoluble, furfural-reactive components of the rosin, dissolved in the furfural to form a viscous solution, are substantially completely removed, mixing furfural with the filtered rosin solution to effect extraction of color bodies therefrom, separating furfural and dissolved color bodies from the rosin solution and recovering refined rosin from the solution.

DONALD H. SHEFFIELD.